Nov. 14, 1944.  H. C. KIRTLAND ET AL  2,362,700

SLEEVE VALVE ENGINE

Filed July 10, 1943  2 Sheets-Sheet 1

Inventors
Hugh C. Kirtland &
Kenneth L. Hulsing
By
Blackmore, Spencer & Flint
Attorneys

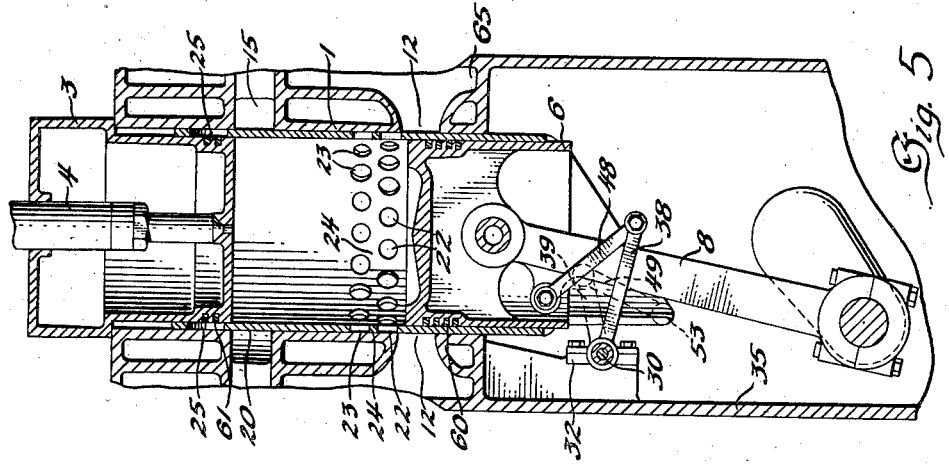
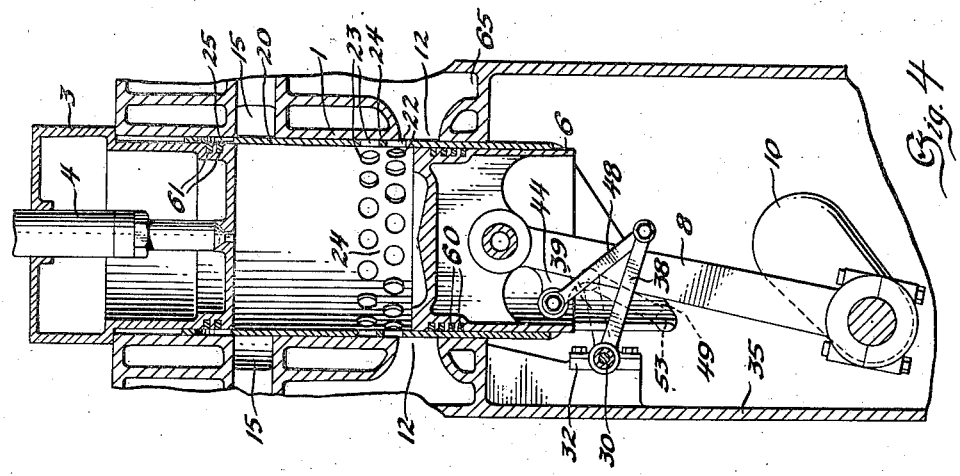
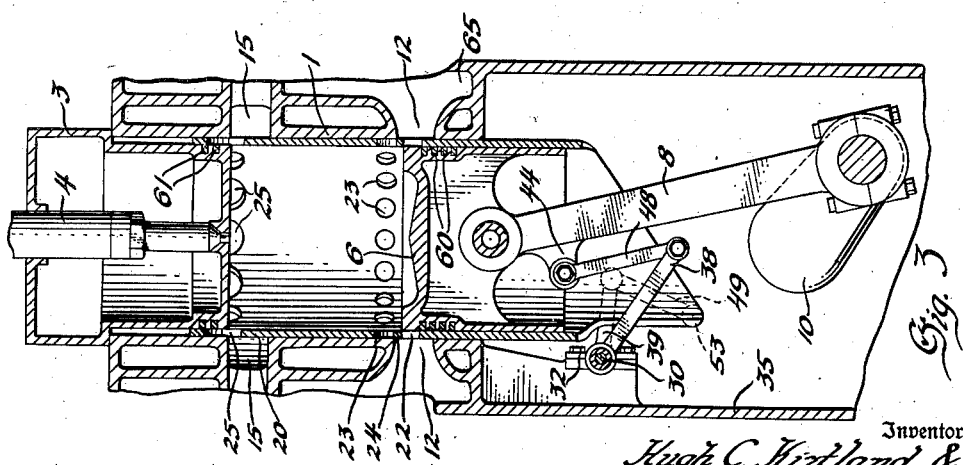

Patented Nov. 14, 1944

2,362,700

UNITED STATES PATENT OFFICE 2,362,700

SLEEVE VALVE ENGINE

Hugh C. Kirtland, Detroit, and Kenneth L. Hulsing, Plymouth, Mich., assignors to General Motors Corporation, Detroit, Mich., a corporation of Delaware Application July 10, 1943, Serial No. 494,138

7 Claims. (Cl. 123—65)

This invention relates to internal combustion engines and especially to two stroke cycle engines, and the ports and valves thereof through which intake and exhaust take place.

It relates more particularly to a two stroke cycle engine with inlet and exhaust ports in the cylinder wall, controlled by a single longitudinally reciprocating sleeve valve.

In a two-cycle engine, exhaust of the burnt charge and intake of fresh charge must occur in a period towards the end of the expansion stroke and at the beginning of the succeeding compression stroke in each cycle.

The area of port opening should be as large as possible, and it should be opened and closed as quickly as possible within a limited number of degrees of crank rotation to provide a maximum time area of port opening with a minimum reduction in the effective lengths of the expansion and compression strokes.

For efficient scavenging and charging, it is also desirable that on the expansion stroke there should be an adequate interval between the opening of the exhaust ports and the opening of the inlet ports to permit exhaust or "blowdown" of the exhaust gases to a pressure equal to or lower than that of the incoming new charge, and that the exhaust ports should be closed before the inlet ports on the compression stroke.

A large area of port opening can be provided by a ring of ports extending in a circumferential series completely around the cylinder wall, and such ports can be and commonly are controlled by the piston or a sleeve valve, but if they are controlled by the piston they necessarily open and close at relatively fixed times and usually at an equal number of degrees of crankshaft rotation on either side of dead center thereof, and when two sets of such ports constituting inlet and exhaust ports respectively are controlled solely by the piston or a single reciprocating sleeve, that set which is opened last on one stroke is necessarily closed first on the next stroke in an opposite direction.

Greater freedom and independence in the timing and sequence of port opening and closing has heretofore been obtained by using two sleeves, or by giving a single sleeve a combined reciprocating and rotary oscillating motion, but in the former case there is at least a necessary duplication of the sleeve valve driving means, and in the latter a more complicated drive and a lessened port area.

For such reasons as the foregoing, the requirements have been but indifferently met in sleeve valve engines as heretofore constructed.

The object of the invention is a two-cycle engine with rings of inlet and exhaust ports of ample area in the cylinder wall which are quickly but smoothly opened and closed by a single sleeve valve having means cooperative with the piston to achieve opening and closing of the ports at the proper time and in the required sequence.

A more specific object of the invention is a two-cycle engine of the foregoing kind having a single suitably ported sleeve which is reciprocated between the piston and the cylinder wall to effect the opening and closing of one of said rings of ports and the closing of the other of said rings of ports, the piston and the sleeve cooperating to control the time of opening of the last-named ring of ports.

The above and other objects of the invention will be apparent as the description proceeds.

According to the invention, the inlet ports are towards the crank end of the cylinder wall and the exhaust ports are towards the other end thereof to provide for through flow scavenging and replacement of burnt charge by a new charge. There are inlet and exhaust ports in the sleeve valve to cooperate with the ports in the cylinder wall and so spaced as to uncover the inlet ports before the exhaust ports upon movement of the sleeve in one direction, and thus to cover the exhaust ports before the inlet ports upon movement of the sleeve in an opposite direction, but a narrow circumferential land dividing the inlet ports in the sleeve valve into two rows cooperates with the piston to seal the path between the inlet ports in the cylinder wall and the interior of the cylinder to delay the opening of the inlet ports until after the opening of the exhaust ports.

The drawings show the application of the invention to a two-cycle Diesel engine.

In the drawings:

Figure 3 shows the relative positions of the parts when the inlet ports are just beginning to open.

Figure 4 shows the relative position of the parts when the exhaust ports have just closed.

Figure 5 shows the relative position of the parts when the inlet ports have just closed.

Figure 1:
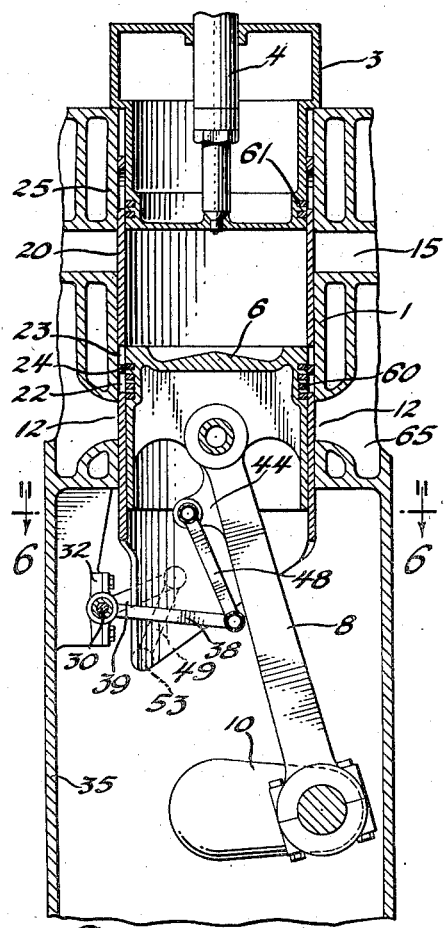
Figure 1 is a sectional view of one cylinder of the engine, showing the piston, the sleeve valve, its driving means and the position of these parts in relationship to the crankshaft.
Figure 6:
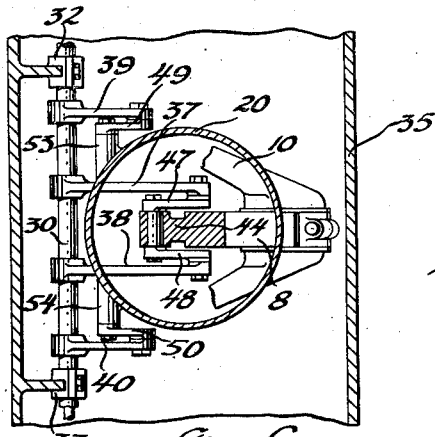
Figure 6 is a view on line 6—6 of Figure 1.

Referring now especially to Figures 1 and 6, the engine includes a water jacketed cylinder 1, a cylinder head 3 with a central injector 4, and a piston 6, with a connecting rod 8 to the crank 10 of a crankshaft.

There is a circumferential series of inlets ports such as 12 towards the crank end of the cylinder, and a circumferential series of exhaust ports such as 15 at the other end thereof.

Interposed between the piston 6 and the wall of the cylinder 1 is a tubular sleeve valve 20 with two circumferential series of inlet ports 22 and 23 separated by a narrow land 24, and longitudinally spaced from a circumferential series of exhaust ports 25 towards the cylinder head end of the sleeve 20.

The sleeve 20 is longitudinally reciprocated parallel to the axis of the cylinder by a linkage to the connecting rod 8. This linkage includes a rock shaft 30 mounted in suitable bearings 32 and 33 secured to the crankcase 35, and having two pairs of arms 37, 38, and 39, 40, rigidly secured thereto. The arms 37, 38 are connected to a lug 44 on the connecting rod by a pair of links 47, 48, by which the rock shaft 30 is oscillated, and the arms 39 and 40 are linked by a pair of links 49 and 50 to lugs 53 and 54 on the sleeve 20.

There are sealing rings 60 on the piston 6, and sealing rings 61 on the outer periphery of the cylinder head 3 which extends internally of the sleeve 20. The rings 60 prevent leakage between the piston and the sleeve, and the rings 61 prevent leakage between the cylinder head and the sleeve.

Since the engine is a two-cycle engine, scavenging and charging air at superatmospheric pressure from a suitable source which may be a blower (not shown) is supplied to the chamber 65 surrounding the inlet ports 12.

Figure 2:
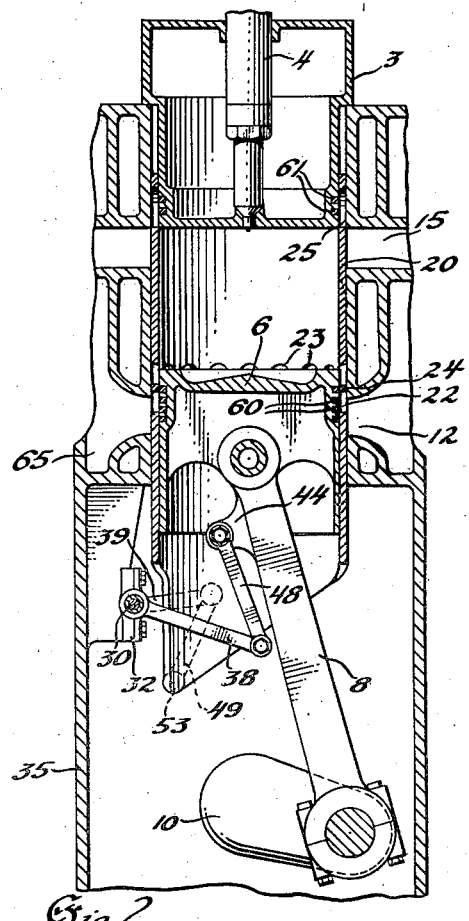
Figure 2 is similar to Figure 1, but shows the relative positions of the parts when the exhaust ports are just beginning to open.
Figure 7:
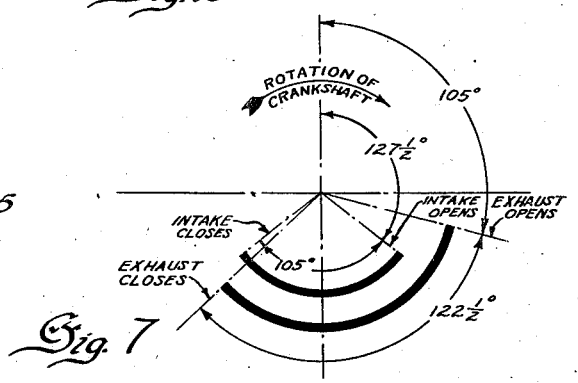
Figure 7 is a diagram showing the valve timing in terms of crank angle.

Referring now to Figures 2–5, in conjunction with Figure 7 which shows the valve timing in terms of the position of the crank 10:

In Figure 2, the piston 6 is moving downwards in the lower part of its expansion stroke, and the sleeve 20 is moving downwards with it. The inlet ports 12 in the cylinder wall 1 have been uncovered by the inlet ports 22 in the sleeve 20, but the inlet ports 12 are not open because the path therefrom into the cylinder remains sealed by the land 24 and the piston 6. The exhaust ports 15 in the cylinder wall are just beginning to be opened by the exhaust ports 25 in the sleeve 20.

As shown in Figure 3, the piston and the sleeve are still moving downwards, but the piston is moving faster than the sleeve. The exhaust port is farther open, and the inlet port 12 is just beginning to be opened by the ports 23 in the sleeve, and by the ports 22 therein as the faster moving piston uncovers the latter. The scavenging and charging air under pressure thus enters the cylinder simultaneously through the ports 22 and 23 in the sleeve, and forces the exhaust gases out through the open exhaust ports.

In Figure 4, the piston is moving upwards in the lower part of its compression stroke and the sleeve is moving upwards with it. The exhaust ports have just been closed by the sleeve. As the crank rotates farther the exhaust ports in the sleeve will be carried above the rings 61 at the periphery of the cylinder head and the rings 61 will then effectively seal the upper end of the cylinder. The lower inlet ports 22 in the sleeve are still open to permit the air passing therethrough at superatmospheric pressure to supercharge the cylinder.

In Figure 5, the piston and the sleeve are still moving upwards and the inlet ports 12 have just been closed by the lower edges of the ports 22 in the sleeve. As the crank rotation continues, the sleeve will slow down and the piston velocity will increase until at top dead center the piston rings 60 will be above the inlet ports 23 in the sleeve and effectively seal the lower end of the cylinder.

It will be noted that the sleeve is driven with non-uniform velocity through its linkage to the connecting rod. The lengths of the links and rocker arms are such that the sleeve has a low velocity during the periods of air compression, fuel burning and gas expansion, but has an increased velocity as the point is reached at which the exhaust ports are to open. Because of this high velocity the exhaust and inlet ports open rapidly and remain about fully open for a short period of time. As the piston reverses its direction of motion the sleeve has its greatest acceleration and closes the exhaust and inlet ports very rapidly.

Because of the fast opening and closing of the ports at the proper time and in the required sequence, and the unobstructed passages provided, a large quantity of air at a low charging pressure, with a minimum expenditure of power in the provision thereof, can be used for scavenging and charging the cylinder with maximum efficiency.

We claim:

1. In an internal combustion engine, a cylinder, a piston in the cylinder, a circumferential series of ports in the cylinder wall, a sleeve valve slidable axially of said cylinder between the piston and the cylinder wall, two circumferential series of ports in the sleeve valve, a narrow circumferential land between said ports, and means for driving the sleeve valve in timed relationship with the piston such that said ports in the cylinder wall are uncovered by the edges of one of said series of ports in the sleeve before they are uncovered by the piston and are closed by said edge before they are covered by the piston; said land cooperating with the piston to seal the path between the ports in the cylinder wall and the interior of the cylinder to delay the opening of said ports until some time after they have been uncovered by the piston.

2. The combination according to claim 1, in which the engine is a two-cycle engine, the ports in the cylinder wall are inlet ports towards the crank end of the cylinder, and there are exhaust ports in the cylinder wall towards the opposite end thereof, and exhaust ports in the sleeve valve cooperative with said exhaust ports in the cylinder wall.

3. The combination according to claim 1, in which the sleeve valve is driven with a longitudinal reciprocating motion at a non-uniform velocity in relationship to the piston.

4. The combination according to claim 1, in which said sleeve valve is driven with a longitudinal reciprocating motion at a non-uniform velocity in relationship to the piston; the means for driving said sleeve valve including a rocker fulcrumed on a stationary part of the engine, a link between said rocker and the sleeve valve, and a link between said rocker and a moving part of the engine.

5. In an internal combustion engine, a cylinder, an inlet port in the cylinder wall towards the crank end thereof, an exhaust port towards the opposite end thereof, a piston in the cylinder, a sleeve valve slidable axially of said cylinder, means for driving said sleeve valve in timed relationship with said piston, an exhaust port in said sleeve valve, axially spaced inlet ports in said sleeve valve with a narrow land between said ports, said valve inlet ports being so spaced that one port may register with the cylinder inlet port before the sleeve valve exhaust port registers with the cylinder exhaust port upon movement of the sleeve valve in one direction, said land and piston then cooperating to seal the path to the interior of the cylinder through its inlet port and said valve inlet port until the registration of said exhaust ports whereupon a further movement of the piston and sleeve valve opens the path through said one valve inlet port and whereby said further movement of the piston and sleeve valve simultaneously opens the path to the interior of the cylinder through the other valve inlet port.

6. In a two-cycle engine, a cylinder, a piston in the cylinder, longitudinally spaced inlet and exhaust ports in the cylinder wall, a sleeve valve between the piston and the cylinder, longitudinally spaced inlet and exhaust ports in the sleeve valve, a narrow circumferential land dividing said inlet ports in the sleeve valve into two rows, and means for driving said sleeve valve with a longitudinal reciprocating motion in timed but out of phase relationship with said piston, to effect the opening and closing of said exhaust ports and the closing of said inlet ports, said piston cooperating with said land to control the time of opening of said inlet ports whereby the movement of the piston opens a passage into the interior of said cylinder through the cylinder inlet opening and the ports of one of said rows simultaneously with the registration of the ports of the other row with the cylinder inlet opening in response to sleeve and piston reciprocation.

7. In a two cycle engine, a cylinder having an inlet port and an outlet port, a sleeve valve slidable within said cylinder, said sleeve valve having an outlet port to register with the cylinder outlet port and axially spaced inlet ports to register with the cylinder inlet port, a piston slidable within said sleeve valve, means to differentially reciprocate said piston and valve whereby prior to the registration of the outlet ports one valve inlet port may register with the cylinder inlet port but which registration shall be ineffective because of the pressure of the piston and whereby a further movement of the sleeve valve to effect registration of the outlet ports shall open its second inlet port to the cylinder inlet port and the simultaneous and accelerated movement of the piston shall render effective the first mentioned sleeve valve inlet port.

HUGH C. KIRTLAND.
KENNETH L. HULSING.